United States Patent [19]
Jellinek et al.

[11] 4,094,925
[45] June 13, 1978

[54] COMPOUND AND ITS USE IN SYNTHETIC RESIN MIXTURES HAVING HIGH REACTIVITY UNDER THE ACTION OF IONIZING RAYS

[75] Inventors: Karl Jellinek, Letmathe; Rudi Oellig, Duisburg-Meiderich, both of Germany

[73] Assignee: Rutgerswerke Aktiengesellschaft, Frankfurt am Main, Germany

[21] Appl. No.: 497,168

[22] Filed: Aug. 12, 1974

[30] Foreign Application Priority Data

Aug. 25, 1973 Germany .......................... 2343085

[51] Int. Cl.² .................. C08L 63/10; C08F 8/00; C08L 75/08
[52] U.S. Cl. ................. 260/836; 204/159.15; 260/837 R; 260/859 R; 427/44; 428/413; 428/418; 560/26; 560/115; 560/158
[58] Field of Search .............. 260/836, 837 R, 859 R; 204/159.15; 427/44

[56] References Cited

U.S. PATENT DOCUMENTS

| | | | |
|---|---|---|---|
| 3,373,221 | 3/1968 | May | 260/837 R |
| 3,509,234 | 4/1970 | Burlant et al. | 260/859 R |
| 3,637,618 | 1/1972 | May | 260/837 R |
| 3,641,210 | 2/1972 | Fellers et al. | 260/885 |
| 3,645,982 | 2/1972 | Larsen | 204/159.14 |
| 3,664,861 | 5/1972 | Okamura et al. | 204/159.15 |
| 3,776,889 | 12/1973 | Dande et al. | 260/77.5 CR |
| 3,966,681 | 6/1976 | Maeda et al. | 260/859 R X |
| 3,989,609 | 11/1976 | Brack | 204/159.15 |

FOREIGN PATENT DOCUMENTS 1,147,732  4/1969  United Kingdom.

*Primary Examiner*—J. Murray Tillman
*Assistant Examiner*—Thurman K. Page
*Attorney, Agent, or Firm*—Beveridge, DeGrandi, Kline & Lunsford

[57] ABSTRACT

A condensation product of a polyepoxide with a monoalcohol or monocarboxylic acid is reacted with a monoisocyanatoallyl or methallyl carbamate to form a novel compound which can be mixed with a vinyl monomer to form a radiation hardenable lacquer composition.

11 Claims, No Drawings

COMPOUND AND ITS USE IN SYNTHETIC RESIN MIXTURES HAVING HIGH REACTIVITY UNDER THE ACTION OF IONIZING RAYS

This invention relates to novel compounds and their use in synthetic resin mixtures, which can be polymerized by means of ionizing radiation rich in energy, especially electron rays with high reaction velocity.

The synthetic resin mixtures of this invention are useful as surface coatings on a variety of substrates. Preferred substrates are, for example, metals, wood, plastics, paper, asbestos cement, concrete, etc.

It is known in the art that radiation hardening of synthetic resin mixtures possess certain advantages when compared to hardening by cross-linking by the action of heat. Among the advantages are the following. First of all, radiation hardening permits the use of systems free of solvents, thereby reducing fire hazards and improving compatibility with the environment. Radiation hardening can also result in a savings in energy. Radiation hardening is accompanied by low hardening temperatures, as a result of which, even temperature sensitive substrates can be coated. Quick hardening of radiation cured coatings results in greatly improved adhesive strength between the substrate and the coating because of a lack of thermal stresses which ordinarily occur on cooling. Finally, radiation hardenable coating systems exhibit considerably longer pot-lives.

German application No. 1,644,817, open to public inspection, describes coating agents containing film-forming organic binders comprising a solution of an α,β-unsaturated resin in vinyl monomers copolymerizable with the resin by ionizing radiation. The resin is an ester condensation product of a polyepoxide and an olefinic, monocarboxylic acid unsaturated in the α,β-position.

It is known that radiation hardenable coatings from these mixtures free of solvents exhibit excellent luster, superior resistance to chemicals and high adhesive strength on various substrates. The coatings, however, require relatively high dosages of ionizing radiation for a satisfactory quick, thorough hardening.

For economic reasons, however, workers in the art strive to limit the intensity of radiation sources used in practical applications. Nowadays, the radiation sources available in continuously operating installations are capable of providing acceleration potentials between 100 and 500 kilo-electron-volts and current intensities of up to 80 mA. As a result, there is a practical limit to the dosage of radiation available. As a measure of radiation dosage, one can use the unit "1 rad". This corresponds to an energy absorption of 100 ergs per gram of absorbing coating.

In order to make curing the electron radiation fully competitive with other lacquering processes, the lacquer industry requires that a lacquer film having a 50 μ thickness be capable of being fully hardened when exposed to a radiation dosage of ≦ 2 megarad (≦ 2 × 10⁶ rad).

It can be shown that an ester condensation product produced according to German application 1,644,817 from a diglycidyl ether of bisphenol A and acrylic acid mixed with 40% styrene and methyl methacrylate requires at least 3.3 megarad for complete hardening when applied as a 50μ thick film on a phosphatized steel plate. (see comparative experiment 6 hereinafter). In all of the examples set forth in German application No. 1,644,817 radiation dosages of about 5 megarad are used for cross-linking of the films.

Accordingly, there exists a need in the art for compounds which can be formulated into synthetic resin mixtures capable of being cured by subjecting the compositions to radiation. The radiation hardenable coating should be capable of being substantially fully hardened when a 50 μ thick layer of the composition is subjected to a radiation dosage of ≦ 2 megarad.

Accordingly, this invention fulfills this need in the art. First of all, this invention provides a compound of the formula:

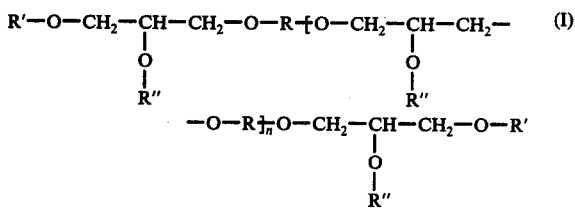

wherein
R is an organic radical;
R' is an alkyl, cycloalkyl, aryl, aralkyl or acyl group;
at least half of all R" radicals have the formula:

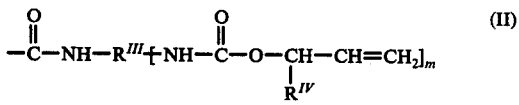

in which m is 1 or 2; and the remaining R" radicals are hydrogen atoms;
R'''is a bivalent (when m = 1) or a trivalent (when m = 2) alkyl, cycloalkyl, aryl, aralkyl, carbamate or carbamide group;
R'' is hydrogen or a methyl group; and
n is zero or a number up to 30.
Preferably, the radical R is a bivalent alkyl, cycloalkyl, aryl or aralkyl group.

It has surprisingly been found that a compound of formula (1) is useful in polymerizable compositions that can be substantially fully hardened when a 50μ thick layer of the composition is subjected to a radiation dosage of ≦ 2 megarad. Accordingly, this invention also provides a composition polymerizable by ionizing radiation, wherein the composition comprises a mixture of the compound of formula (1) and at least one vinyl monomer copolymerizable with the compound of formula (1).

This invention also provides a substrate having thereon a hardened coating of the radiation hardenable composition of this invention.

Additionally, this invention provides for the use of the radiation hardenable composition of this invention as a coating composition. The use comprises the process of (a) applying a layer of the composition of this invention to a substrate; and (b) irradiating said layer to thereby harden the composition, wherein the composition is such that a 50μ thick layer thereof is capable of being hardened when subjected to a radiation dosage of ≦ 2 megarad.

Compounds according to formula (1) can be prepared by the conversion of polyepoxide compounds with monoalcohols or monocarboxylic acids in stoichiometric proportions with regard to the epoxy groups in the epoxy starting materials. Typical of the monoalcohols are methyl, isopropyl, butyl, allyl and benzyl alcohol. Typical of the monocarboxylic acids are acetic acid, propionic acid, valeric acid, benzoic acid, acrylic acid and methacrylic acid. One obtains an intermediate compound having hydroxyl groups. At least half of the hydroxyl groups present in the intermediate are reacted with monoisocyanatoallyl carbamates or monoisocyanatomethallyl carbamates of the formula:

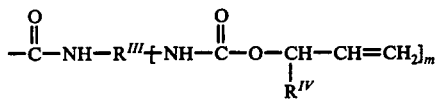 (II)

wherein
  $m$ is 1 or 2;
  $R^{III}$ is a bivalent (when $m = 1$) or a trivalent (when $m = 2$) alkyl, cycloalkyl, aryl, aralkyl, carbamate or carbamide group; and
  $R^{IV}$ is hydrogen or a methyl group.

These unsaturated monoisocyanates can be prepared by the molar conversion of diisocyanates with allyl or methallyl alcohol, or by the reaction of one mole of a triisocyanate with two moles of allyl or methallyl alcohol.

As polyepoxide compounds, one can employ basically all compounds that contain more than one epoxy group per molecule. These compounds can be prepared by the reaction of polyphenols or polyalcohols with epichlorohydrin, for example according to U.S. Pat. Nos. 2,467,171, 2,538,072, 2,558,959 and 2,694.694, or by the reaction of polyunsaturated compounds with organic peracids as described in a number of references including U.S. Pat. Nos. 2,853,498, 2,853,499 and 2,829,135.

Preferred for use in this invention are the reaction products of bisphenol A with epichlorohydrin in an alkaline medium. Also preferred are the polyglycidyl ether of resorcinol, phenol novolaks, butyl glycol, hexanediol, glycerin, trimethylol propane and neopentyl glycol. Exemplary of the polyunsaturated compounds epoxidized by peracids are epoxidized cyclo-olefins, such as 3,4-diepoxy-6-methyl-tetrahydro-benzyl-3'; 4'-diepoxy-6'-methyl-tetrahydro-benzoate; vinyl cyclohexenedioxide and others.

Suitable diisocyanates for the production of the compounds according to formula (2) are, for example, toluene diisocyanate, isophorone diisocyanate, 4,4',4"-triisocyanato-triphenylamethane; 4,4'-diisocyanato diphenylmethane; 1,6-diisocyanato-hexane; m-xylylene-diisocyanate; N,N',N"-triisocyanato-biuret and others.

As copolymerizable vinyl monomers one can employ, among others, styrene, esters of acrylic and methacrylic acid for example, an ester of acrylic or methacrylic acid with a long-chained alcohol, vinyl toluene, divinyl benzene and diallyl malenate. Preferably, the composition of this invention comprises about 20 – 80 parts by weight of the vinyl monomers and about 80 – 20 parts by weight of the compounds of formula (1).

The compositions of this invention can be painted on any desired substrate, and then lead past an electronic accelerator as the source of radiation at such a rate that substantially complete hardening will take place. The maximum throughput velocity will depend on the capacity of the electronic accelerator. As the following examples demonstrate, twice as high throughput performances are achieved according to this invention as compared with compositions disclosed in German application No. 1,644,817 under the same radiation conditions.

The composition of this invention comprising synthetic resin mixtures can be hardened by radiation to produce films having high luster, excellent mechanical characteristics and resistance to chemicals comparable to thermally hardened epoxy resin films.

This invention will be more fully understood by reference to the following examples in which all parts, proportions and percentages are by weight unless otherwise indicated.

EXAMPLES OF THE PRODUCTION OF UNSATURATED MONOISOCYANATES (PRELIMINARY PRODUCTS)

Preliminary Products A: (Reaction Product of Allyl Alcohol and Toluene Diisocyanate)

To a three-necked flask equipped with stirrer, reflux cooler, thermometer and dropping funnel, 3700 g of toluene diisocyanate are added and heated to 80° C. Within 1 hour and with simultaneous cooling, 1300 g of allyl alcohol are added drop by drop. At the same time one must be careful that the temperature does not rise above 90° C. After that, this is kept for 1 hour at 80° C.

There results a viscous product having the following characteristics:

Viscosisty at 25° C: 450 cps
Density at 25° C: 1.2 g/ml
Refractive index nD 25: 1.5615
Isocyanate content: 18.4% (theoretical: 19.2%)

Preliminary Product B: (Reaction Product of Desmodur L with Allyl Alcohol)

To a three-necked flask equipped with stirrer, thermometer, reflux cooler and dropping funnel, 875 g of "Desmodur" L (75% in ethyl acetate) are added and heated to 80° C. Within 1 hour, 116 g of allyl alcohol (2 moles) are added drop by drop, and re-reacted at 90° C for 1 hour. After that, the ethyl acetate is distilled off in vacuum up to 150° C. A product results having a softening range from 106°– 112° C. (KS)

Isocyanate content: 5.4% (theoretical: 5.8%) "Desmodur" L is the commercial name for a reaction product made from 1 mole trimethylol propane and 3 moles toluene diisocyanate, which is present as a 75% solution in ethyl acetate and which has an NCO content of about 13%.

Preliminary Product C: (Reaction Product from Desmodur N with Allyl Alcohol)

To a three-necked flask equipped with a stirrer, thermometer, dropping funnel and reflux cooler, 638 g of "Desmodur" N 75% in xylene/ethyl glycol actate 1:1 (1 mole) are added and heated to 80° C. Within 1 hour, 116 g of allyl alcohol (2 moles) are added drop by drop at 80° – 90° C. Subsequently this is re-reacted for 1 hour at 90° C.

After distilling away the solvent mixture in the vacuum up to 150° C, a product with a softening range from 23°– 27° C will result.

The NCO content amounts to: 6.7% (theoretical: 7.1%)

"Desmodur" N is the commercial name for a 75% solution of N,N',N"-triisocyanatobiuret in xylene/ethyl glycol acetate (1:1).

EXAMPLE 1

To a three-necked flask equpped with stirrer, thermometer and reflux cooler, are added 1350 g of diglycidyl ether of bisphenol A, epoxy equivalent 185, 2190 g of methacrylic acid and 2.2 g of hydroquinone. Subsequently, this is reacted for 5½ hours at 120° C. After that, excess methacrylic acid is distilled at 130° C under a vacuum of 20 mm Hg. A highly viscous product with the following analysis results:

Acid number: 27.8 mg KOH/g
Saponification number: 136 mg KOH/g 540 g of intermediate product are heated to 100° C, 0.5 g of hydroquinone are added, and 455 g of preliminary product A are added drop by drop within 1 hour. After that, this is re-reacted for another hour at 100° – 120° C. A product having the following characteristics is obtained:

Acid number: 6.4 mg KOH/g
Saponification number: 43.1 mg KOH/g 1000 g of this resin-like product are dissolved in 600 g of a mixture consisting of each time 50% styrene and methyl methacrylate to form a liquid binder, the viscosity of which measured in a DIN beaker (DIN = German industrial standard) having a 4 mm nozzle is 120 sec. (20° C).

The results of the radiation hardening of this binder in a thin layer by ionizing electron rays are summarized in Example 7.

EXAMPLE 2

The process according to Example 1 is repeated with the variation that 540 g of the described intermediate product are reacted with 3080 g of a 50% solution of preliminary product B, dissolved in MIBK (i.e., methyl isobutyl ketone), under the same conditions as described in Example 1. After complete reaction, the MIBK is distilled away at 130° C under vacuum. A product having the following characteristics results:

Softening point: 90° C (KS)
Acid number: 4 mg KOH/g
Saponification number: 99.4 mg KOH/g 1000 g of this resin-like product are dissolved in 650 g of a mixture of 70% methyl methacrylate and 30% vinyl toluene to form a binder, the viscosity of which in a DIN beaker (4 mm nozzle) is 120 sec. at 20° C. The results of the electron ray hardening of the binder in a thin layer are summarized in Example 7.

EXAMPLE 3

The process described in Example 1 is repeated analogously with the variation that 540 g of the intermediate product described there are completely reacted with 1700 g of a 70% solution of the preliminary product C (in MIBK). After that, the solution is distilled at 130° C in a vcuum. A product having the following characteristics results:

Softening point: 40° C (KS)
Acid number: 2.4 mg KOH/g
Saponification number: 62.8 mg KOH/g When 1000 g of this resin-like product are dissolved in 630 g of a 1:1 mixture of styrene and methacrylic acid methyl ester, a fluid binder having a viscosity at 20° C in a DIN beaker (4 mm nozzle) of 132 sec. is obtained. The results of the radiation hardening of this binder in a thin layer are summarized in Example 7.

EXAMPLE 4

To a three-necked flask equipped with thermometer, stirrer, reflux cooler and dropping funnel, 1250 g of resorcinol diglycidly ether, 3000 g of methacrylic acid and 1.5 g of hydroquinone are added and reacted at 120° C for 3 hours. After that, the excess methacrylic acid is distilled at 130° C in a vacuum. A liquid product having the following characteristics results:

Acid number: 18.7 mg KOH/g
Saponification number: 110 mg KOH/g 500 g of this intermediate product are heated to 100° C; over a 1 hour period 275 g of preliminary product A are added, and subsequently this is re-reacted for 1 hour. At the same time, the temperature is slowly raised to 140° C. Subsequently, this is subjected for a brief time to a vacuum in order to remove volatile components. A product with the following values results:

Acid number: 2.7 mg KOH/g
Saponification number: 84 mg KOH/g 700 g of the resin-like condensation product are dissolved in 460 g of a mixture of methacrylic acid methyl ester (60%) and ethylene diacrylate (40%) to form a binder having a viscosity in a DIN beaker (4 mm nozzle) of 120 sec. at 20° C. The results of the radiation hardening of this binder are summarized in Example 7.

EXAMPLE 5

To a three-necked flask equipped with thermometer, stirrer, reflux cooler and drip funnel, 1035 g of hexanediol diglycidyl ether, 5 g of hydroquinone and 2000 g of propionic acid are added. The temperature is slowly raised to 120° C, and this is reacted for 3 hours at this temperature. Subsequently, excess propionic acid is distilled away in a vacuum up to a 130° C sump temperature. A product having the following analyzed values results:

Acid number: 25.0 mg KOH/g
Saponification number: 116 mg KOH/g 500 g of this intermediate product are reacted with 275 g of preliminary product A within 1 hour at 100° C, and are then re-reacted for 1 hour at 140° C. The remaining volatile components are removed by means of a short vacuum treatment.
Analysis:

Acid number: 20.9 mg KOH/g
Saponification number: 76 mg KOH/g 700 g of the resin-like product are dissolved in a mixture of 460 g of styrene (⅓), methacrylic acid methyl ester (⅓) and ethylene dimethacrylate (⅓) to form a binder having a viscosity at 20° C of 135 sec., measured in a DIN beaker with 4 mm nozzle. The results of hardening by means of ionizing electron rays in a thin layer are summarized in Example 7.

EXAMPLE 6

To a three-necked flask which is equipped with stirrer, thermometer and reflux cooler, 1350 g of diglycidyl ether of the bisphenol A having an epoxy equivalent of 185, 2190 g methacrylic acid and 2.3 g hydroquinone are added. The mixture is heated slowly to 120° C, and is kept at this temperature for 5½ hours. Subsequently, the excess methacrylic acid is removed by distillation under a full vacuum of a water jet pump. The resulting product is resin-like, viscous and has the following analytic characteristics:

Acid number: 25.8 mg KOH/g
Saponification number: 136 mg KOH/g

A binder according to German published application No. 1,644,817 is produced from this intermediate product by dissolution in a mixture of methacrylic acid methyl ester and styrene 1:1. The binder has a viscosity in a DIN beaker (4 mm nozzle) of 120 sec. at 20° C. The content of vinyl monomer mixture amounts at the same time to 40%. The results of the treatment of this binder with ionizing electron rays in a thin layer are summarized in Example 7.

EXAMPLE 7

The binders of Examples 1–6 are applied in layers by means of a suitable lacquer application device to phosphatized steel plates at a thickness of 50μ. and are guided at a distance of 20 cm past a source of electron rays having a variable pass-through velocity. The potential of the electron ray generator is 320 kilo-electron-volts and the current density is 50 mA.

The linear pass-through velocity of the sample plates is increased in each case for such a length of time until a clear drop in the technical characteristics of the lacquer films indicates the minimum radiation dosage which is required for the substantial cross-linking of the binders.

The following table summarizes the results obtained.

RESULTS OF EXPERIMENTS OF CROSS-LINKING WITH ELECTRON RAYS IN A THIN LAYER

| | | | | |
|---|---|---|---|---|
| Belt velocity in m/minute | | 7 | | 15 |
| Dose of radiation in Mrad | | 9 | | 4.2 |
| Surface quality of the films | tackfree | pendulum hardness (sec.) | tackfree | pendulum hardness (sec.) |
| Product according to Example 1 | + | 185 | + | 185 |
| " 2 | + | 186 | + | 186 |
| " 3 | + | 178 | + | 178 |
| " 4 | + | 192 | + | 190 |
| " 5 | + | 172 | + | 170 |
| " 6 (Comparative Example) | + | 160 | + | 160 |
| Belt velocity in m/minute | | 20 | | 25 |
| Dose of radiation in Mrad | | 3.3 | | 2.5 |
| Surface quality of the films | tackfree | pendulum hardness (sec.) | tackfree | pendulum hardness (sec.) |
| Product according to Example 1 | + | 183 | + | 180 |
| " 2 | + | 184 | + | 180 |
| " 3 | + | 175 | + | 174 |
| " 4 | + | 187 | + | 182 |
| " 5 | + | 165 | + | 160 |
| " 6 (Comparative Example) | + | 155 | + | 60 |
| Belt velocity in m/minute | | 30 | | 35 |
| Dose of radiation in Mrad | | 2.1 | | 1.8 |
| Surface quality of the films | tackfree | pendulum hardness (sec.) | tackfree | pendulum hardness (sec.) |
| Product according to Example 1 | + | 175 | + | 167 |
| " 2 | + | 178 | + | 170 |
| " 3 | + | 170 | + | 165 |
| " 4 | + | 175 | + | 167 |
| " 5 | + | 155 | + | 148 |
| " 6 (Comparative Example) | + | 39 | − | 26 |
| Belt velocity in m/minute | | 40 | | 45 |
| Dose of radiation in Mrad | | 1.6 | | 1.4 |
| Surface quality of the films | tackfree | pendulum hardness (sec.) | tackfree | pendulum hardness (sec.) |
| Product according to Example 1 | + | 90 | − | 26 |
| " 2 | + | 162 | + | 67 |
| " 3 | + | 150 | + | 120 |
| " 4 | + | 150 | + | 62 |
| " 5 | + | 132 | + | 52 |
| " 6 (Comparative Example) | − | — | − | — |

As used herein, the expression "vinyl monomer" refers to polymerizable organic compounds containing the $CH_2=CH$-group and polymerizable compounds containing this group substituted in the α-position (i.e. vinylidene compounds).

It will be understood that the $n$ in formula (I) can be an average number representing a number of compounds of this formula in admixtures, and therefore, may or may not be an integer.

Among the preferred radicals standing for R, R' and R" the following are mentioned:

R means a bivalent alkyl group of the formula —CH$_2$—[CH$_2$]$_o$—CH$_2$— in which $o$ is zero or a number up to 10, or a bivalent cycloalkyl group of the formulas

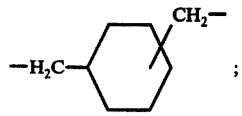

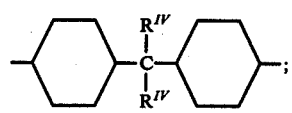

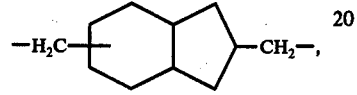

in which R$^{IV}$ is H or methyl group or a bivalent aryl group of the formulas

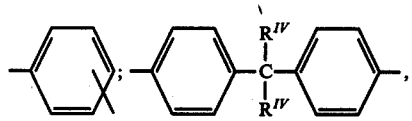

in which R$^{IV}$ is H or methyl group R' means alkyl groups of the formulas

CH$_3$—; C$_2$H$_5$—; C$_4$H$_9$— cycloalkyl groups of the formula

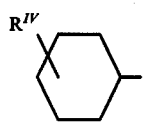

wherein R$^{IV}$ is H or methyl group
aryl groups of the formula

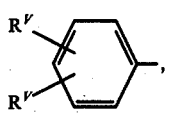

wherein R$^V$ is H or methyl or butyl group
acyl groups of the formulas

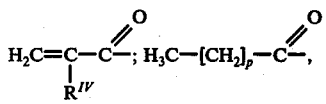

wherein R$^{IV}$ is H or methyl group and in which $p$ = 0 to 10

R'" means bivalent alkyl groups of the formula —CH$_2$—[C$_2$]$_q$—CH$_2$—, in which $q$ = 1 to 10, or bivalent cycloalkyl groups of the formulas

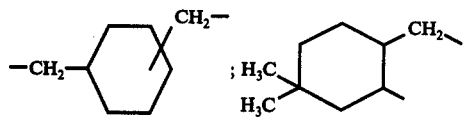

or bivalent aryl groups of the formulas

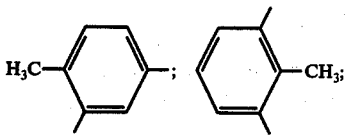

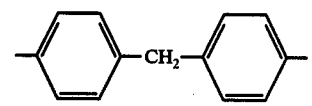

or a trivalent carbamate group of the formula

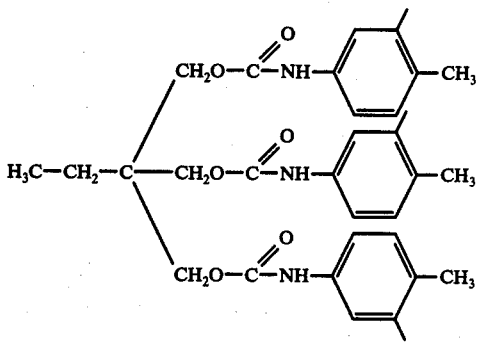

or a trivalent carbamide group of the formula

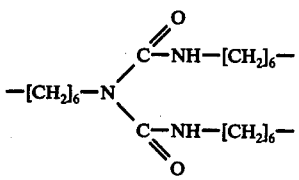

What is claimed is:

1. A composition polymerizable by ionizing radiation said composition comrising a compound of the formula:

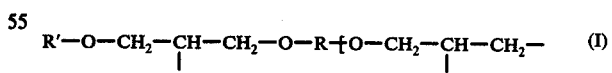
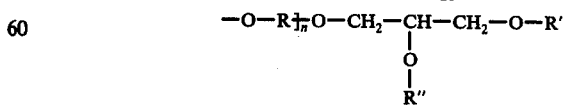

wherein
R is an organic radical;
R' is an alkyl, cycloalkyl, aryl, aralkyl or acyl group;
at least half of all R" radicals have the formula:

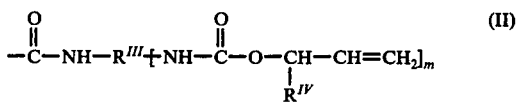

(II)

in which m is 1 or 2; and the remaining R'' radicals are hydrogen atoms;

R''' is a bivalent (when m = 1) or a trivalent (when m = 2) alkyl, cycloalkyl, aryl, aralkyl, carbamate or carbamide group;

R$^{IV}$ is hydrogen or a methyl group; and n is zero or a number up to 30; and at least one vinyl monomer copolymerizable with said compound.

2. Composition according to claim 1 in which R is bivalent alkyl, cycloalkyl, aryl or aralkyl.

3. Composition according to claim 2 wherein a 50 μ thick layer of said composition is hardenable by radiation of ≦ 2 Megarad.

4. Composition according to claim 3 in which the vinyl monomer is styrene, an ester of acrylic or methacrylic acid, vinyl toluene, divinyl benzene, diallyl maleate, or an ester of allyl alcohol with a mono- or polycarboxylic acid.

5. Composition according to claim 3 in which said compound comprises about 80 – 20 parts by weight of said composition and said vinyl monomer comprises about 20 – 80 parts by weight of said composition.

6. Composition according to claim 3 in which said vinyl monomer is an ester of acrylic or methacrylic acid with a long chained alcohol.

7. Composition according to claim 5 in which said vinyl monomer is styrene, methyl methacrylate, vinyl toluene, ethylene diacrylate, ethylene dimethacrylate, or mixtures thereof.

8. Composition according to claim 5 wherein R is a bivalent alkyl group of the formula —CH$_2$—[CH$_2$]$_o$—CH$_2$— in which o is zero or a number up to 10; or a bivalent cycloalkyl group of the formula

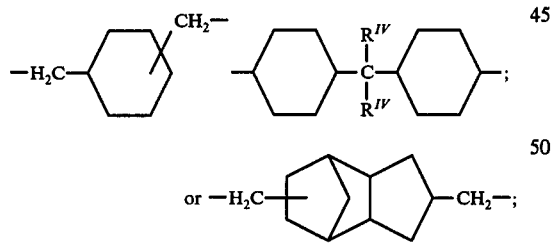

in which B$^{IV}$ is H or methyl; or a bivalent aryl group of the formula

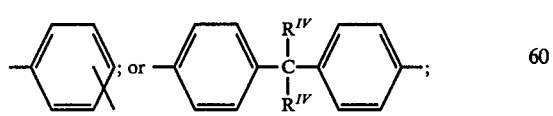

in which R is H or methyl.

9. Composition according to claim 5 wherein R' is an alkyl group of the formula

CH$_3$—; C$_2$H$_5$—; C$_4$H$_9$—; or cycloalkyl group of the formula

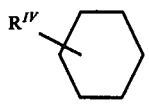

wherein R$^{IV}$ is H or methyl; or aryl group of the formula

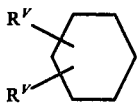

wherein R$^v$ is H, methyl or butyl; or acyl group of the formula

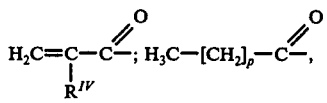

wherein R$^{IV}$ is H or methyl and in which p is 0 to 10.

10. Composition according to claim 5 wherein R''' is a bivalent alkyl group of the formula

in which q is 1 to 10; or bivalent cycloalkyl group of the formula

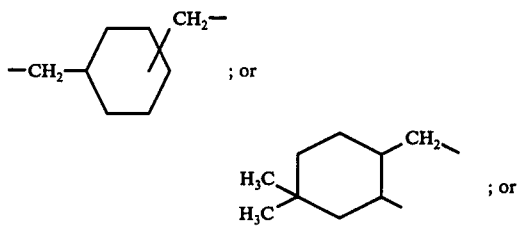

bivalent aryl group of the formula

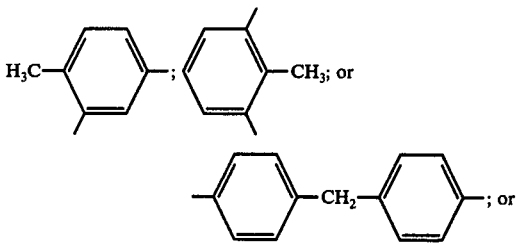

trivalent carbamate group of the formula

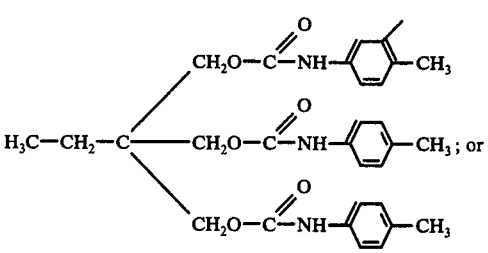

trivalent carbamide group of the formula

13
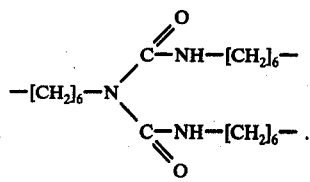
11. Composition according to claim 1 in which R' is allyl.
* * * * *
14
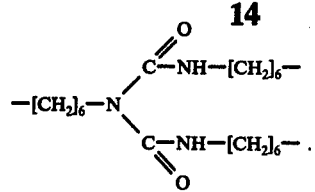
11. Composition according to claim 1 in which R' is allyl.
* * * * *